US00RE35182E

United States Patent [19]

Howard

[11] E Patent Number: Re. 35,182

[45] Reissued Date of Patent: Mar. 19, 1996

[54] GAMING AND AMUSEMENT MACHINES AND REELS FOR THEM

[75] Inventor: Terence Howard, Nottingham, England

[73] Assignee: Bell-Fruit Manufacturing Company Limited, Nottingham, England

[21] Appl. No.: 328,488

[22] Filed: Oct. 25, 1994

Related U.S. Patent Documents

Reissue of:

[64] Patent No.: 5,211,399
Issued: May 18, 1993
Appl. No.: 833,860
Filed: Feb. 11, 1992

U.S. Applicatins

[67] Continuation of PCT/GB90/01256, Aug. 10, 1990.

[30] Foreign Application Priority Data

Aug. 12, 1989 [GB] United Kingdom ..... 8918448

[51] Int. Cl.[6] ..... G09F 11/12

[52] U.S. Cl. ..... 273/143 R; 40/472; 40/552; 40/506

[58] Field of Search ..... 273/143 R, 138 A; 40/472, 552, 506

[56] References Cited

U.S. PATENT DOCUMENTS

| | | | |
|---|---|---|---|
| 2,035,084 | 3/1936 | May | 273/143 |
| 2,545,644 | 3/1951 | Benton et al. | 273/143 |
| 4,249,737 | 2/1981 | Hancherick | 273/143 |
| 4,262,906 | 4/1981 | Heywood | 273/143 |
| 4,534,560 | 8/1985 | Okada | 273/143 |
| 4,621,815 | 11/1986 | Yamamoto | 273/143 |
| 4,711,452 | 12/1987 | Dickinson et al. | 273/143 |
| 4,765,078 | 8/1988 | Yamamoto | 40/309 |
| 4,773,648 | 9/1988 | Itoh | 273/143 |
| 4,874,172 | 10/1989 | Nakamura | 273/143 |
| 4,912,389 | 3/1990 | Eguchi | 318/696 |

FOREIGN PATENT DOCUMENTS

| | | |
|---|---|---|
| 0142370 | 5/1985 | European Pat. Off. . |
| 0317123 | 5/1989 | European Pat. Off. . |
| 2921159 | 4/1980 | Germany . |
| 3-21278 | 1/1991 | Japan . |
| 412289 | 6/1934 | United Kingdom . |
| 1233081 | 5/1971 | United Kingdom . |
| 1488658 | 10/1977 | United Kingdom . |
| 2092795 | 8/1982 | United Kingdom . |
| 2137514 | 10/1984 | United Kingdom . |
| 2165074 | 4/1986 | United Kingdom . |
| 2165387 | 4/1986 | United Kingdom . |
| 2183883 | 6/1987 | United Kingdom . |

*Primary Examiner*—Benjamin H. Layno
*Attorney, Agent, or Firm*—Christensen O'Connor Johnson & Kindness

[57] ABSTRACT

A reel for a gaming or amusement machine, of the type commonly known as a fruit machine, has a reel strip which has symbols at least partially within sunken regions of the [reel strip]*reel-strip*.

The symbols may be formed in relief in the sunken regions but do not project above a frame which surrounds the sunken regions. The surface of the frame may be arcuate, such that the reel is cylindrical in shape, or flat, such that the reel is polygonal.

21 Claims, 3 Drawing Sheets

GAMING AND AMUSEMENT MACHINES AND REELS FOR THEM

Matter enclosed in heavy brackets [ ] appears in the original patent but forms no part of this reissue specification; matter printed in italics indicates the additions made by reissue.

*This application is a continuation of prior copending international PCT Application No. PCT/GB/01256, filed on Aug. 10, 1990, the benefit of the filing date which is hereby claimed under 35 U.S.C. § 120.*

This invention relates to gaming and amusement machines and in particular to those commonly known as fruit machines. In such machines a number of reels, usually three or four, carrying symbols on their peripheries are spun and then stopped at random. If they come to a halt with any one of a number of selected combinations of symbols on a so-called 'win line', an award is made or other equivalent benefit is obtained. Such a machine will hereinafter be referred to as of the kind set forth.

Traditionally these reels have been mechanical, rotating side by side on a common axis and with the symbols carried on their peripheral cylindrical surfaces. This is almost universal although in certain countries, e.g. Germany, the reels are sometimes in the form of flat discs with the symbols arranged in a ring on one face. Even an arrangement involving each reel being in the form of a frustum of a cone, with the peripheries lying in a common conical surface, is known.

Attempts have been made to get away from the simple printed representation of the symbols, usually fruit such as plums, cherries, oranges and so on, and it has been proposed to project the symbols optically in turn onto a flat translucent screen, the so-called Panascope system. We have ourselves proposed to use a video screen on which an electrically generated image of the rotating reels is displayed. However these alternatives lack the contrast and brightness of a colour-printed two-dimensional picture of the symbol and so there has lately been a reversion to the mechanical reels with the symbols on their peripheries.

It has been proposed, in GB 2 183 883 A, to provide gaming and amusement machines with symbols formed in relief, i.e. in three-dimensions, on the periphery of the reel so that they stand out from the surface of the reel.

The general outline of the use of such symbols in relief is described in GB 2 183 833 A, and the functional advantages of the such use is intimated. The ability, for example, to [ recognise] *recognize* the symbols rapidly is enhanced, which improves the user's perception of the game, and the recognition in particular of symbols further round the periphery of the reel (away from the winline) allows the machine to be constructed so that certain game sub-features (such as nudging, for example) are possible under conditions in which, with conventional flat-printed reel strip symbols, they would not otherwise be practicable.

Suggested methods of forming symbols in relief, which conventionally would be fruit symbols but could be in other forms as required by the game, have, up to now, been based upon the symbol concerned being raised from the surface of a flat reel-strip base material, such that the material forming the reel-strip at any point on the embossed or raised area is situated at a greater radius than that of the base material. There is a severe disadvantage of this approach which has become apparent in practice, however, in that the base material must conform to the surface of the reel drum in order to be mounted accurately to it; the reel drum, being a rotated component, needs to be symmetrical (i.e. cylindrical), and hence the surface onto which the reel-strip base material is fitted is also cylindrical. In current art, it is known that the reel drum does not need to be a complete surface, and that large parts of its area can be beneficially removed to conserve weight (and hence reduce inertia) and material content; however, the reel-strip material itself still has to conform to the cylindrical outline of that part of the reel drum remaining, particularly along the outside rim of the drum which is the main reel-strip supporting element. The disadvantage of the relief or embossing method as described above is that the reel-strip material deforms under the process for forming the symbols in relief, and when wrapped around the reel drum tends to form a series of inaccurate straight edges at parts of the strip containing the symbols in relief, and curves of sharper than required radius at points where there are no such symbols in relief. The mount to which such distortion occurs is not easily predictable and depends to a certain extent on the shape of the particular symbol. This inaccuracy makes the reel-strip difficult to fit, and also the lack of precise control in the exact shape of the edges of the reel-strip make the risk of fouling on the reel drum-supporting components likely.

Also, conventional reel drums are usually rotated by an electrically driven motor, for instance a stepper motor, and in order to lessen the dynamic load on the motor driving the rotating parts of the reel assembly, it is usual to remove any unnecessary material from the drum, whilst still retaining a rim to provide circumferential attachment for the reel-strip; the conventional reel-strip not being of any significant structural strength.

According to a first aspect of the invention there is provided a reel strip for a gaming or amusement machine having a first surface adjacent a sunken region provided below the level of the first surface, and a symbol, or fruit, displayed at the sunken region.

The sunken region gives the strip a three-dimensional profile and increases its strength. There may be separate sunken regions for each symbol or fruit, the sunken regions drawing the attention of the user to the fruit.

Preferably there are a plurality of sunken regions.

The first surface preferably extends at least partially around [ the or] each sunken region.

The symbols may be two-dimensional, e.g. by being printed onto the material of the strip within the surrounding regions, but preferably they are formed in relief so that they stand out from the sunken surrounding regions. A mixture of 2-D and 3-D symbols may be provided.

When the symbols are formed in relief, preferably they are formed to a maximum height so that the height of the outermost part of each symbol above its sunken surrounding region does not exceed the height of the raised sections of the reel-strip.

The raised sections of the reel-strip and the sunken regions surrounding the symbols thus form a "frame" for each symbol which imparts to the reel-strip an accurately-defined shape, irrespective of the profile of and degree of relief imparted to the fruit symbol itself. The reel-strip itself is thereby an accurately reproducible component and its fitting to the periphery of the reel drum is greatly eased, as are any potential problems of fouling with other parts of the assembly.

The frame may be shaped such that the reel has an overall cylindrical shape. However, in certain reel arrangements, it may be advantageous for the reel to be substantially polygonal. In this case, the frames are arranged to be flat with bends being formed between adjacent frames.

The reel in accordance with the invention may comprise a conventional rotatable reel drum element with the novel form of reel-strip attached around its outer periphery.

Alternatively, instead of a conventional reel drum element the support element for the reel-strip may be of skeletal form, for example comprising two circular members of the same diameter connected at regular circumferentially spaced intervals by transverse cross-members, with radial spokes extending from the cross-members to the centre of the reel. In an alternative version there need be only one circular member having projecting support members.

In this type of reel assembly it is a relatively simple matter to attach the reel strip to the support element with the sunken regions surrounding the symbols being positively and accurately located in the spaces between the transverse cross-members. It is difficult to achieve such accurate location with a flat reel-strip or with a reel-strip with embossed symbols standing out from the outer surface of the strip.

Furthermore, the reel-strip with its configuration of raised sections and sunken regions surrounding the symbols possesses sufficient structural properties to render the use of the reel drum or other support element unnecessary. A reel-strip which has 3-D profiled symbols in its sunken regions is particularly strong. The advantage of this is that it reduces the cost of the reel assembly, reduces the number of individual parts, reduces use of material and also reduces the need for expensive investment in mould tooling, as the tooling costs for the relief forming reel-strips are substantially less, if for example vacuum forming techniques are used, than those of an injection-moulding tool for an entire reel drum. In this case the drive part of the reel mechanism assembly may consist of a drive spindle fitted with a "spider" arrangement, to the ends of the arms of which would be affixed a reel-strip in accordance with the first aspect of the invention. The cylindrical form of the reel would be defined by the reel-strip itself, which although still consisting of thin plastic material would have structural integrity imparted to it by its form.

The reel-strip as described above in accordance with the first aspect of the invention thus gives benefits in the fitting of the reel-strip to the reel drum or other reel-strip support element, in the reduction of the possibility of fouling on other components during rotation in the positive location of its position around the periphery, and in the opportunity to save material in the reel assembly. This is particularly so of reel-strips having profiled fruit.

A possible production method for such reel-strips may be based on conventional vacuum-forming equipment, using raised relief moulds for the symbol "frames" and for the symbols themselves. In current practice, the variety of fruit or other symbols in common use is fairly restricted, to between possibly ten and twenty over all in machines in production at any one time. In the fabrication of moulds to form such reel-strips, therefore, a technique in which the symbol "frames" are standard to all machines and the different arrangements of fruit or other symbols required for an individual machine could be made up by the use of mould inserts in the relevant positions could be used.

According to a second aspect the invention comprises a reel having a reel-strip in accordance with the first aspect of the invention.

According to third and fourth aspects the invention comprises a gaming or amusement machine having a reel-strip in accordance with the first aspect of the invention or a reel in accordance with the second aspect of the invention.

Some embodiments of the present invention will now be described, by way of example only, with reference to the accompanying drawings in which.

Figure 1:
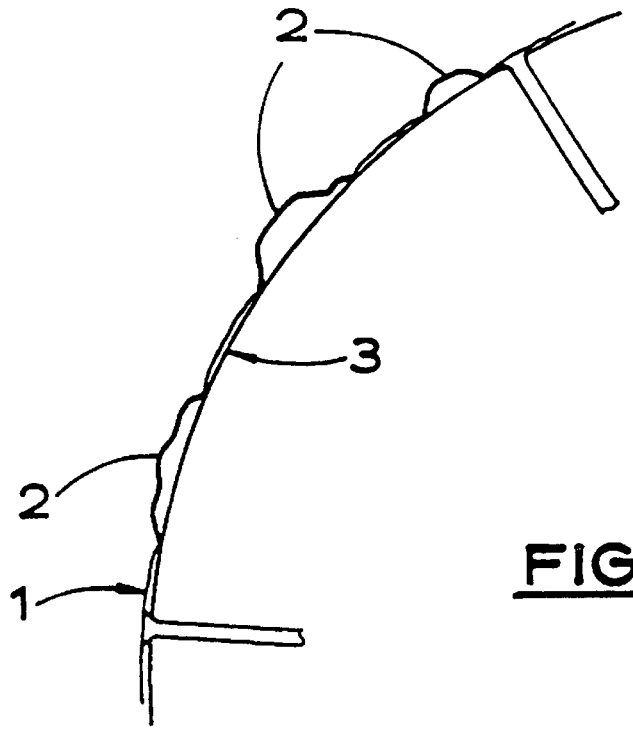
FIG.1. PRIOR ART.
FIG. 1 is a sketch view showing in profile a known type of reel-strip attached to a reel drum of a fruit machine.

FIG. 1 shows a known type of reel-strip 1 having embossed symbols 2 formed in relief which stand out from the surface of the strip. The strip 1 is attached to the outer periphery of a conventional reel drum 3. The strip with embossed symbols 2 of this form, however, suffers from the disadvantage that the reel-strip material deforms under the embossing process and consequently the reel-strip does not fit very well onto the reel drum 3 and there is a risk of fouling during rotation.

Figure 2:
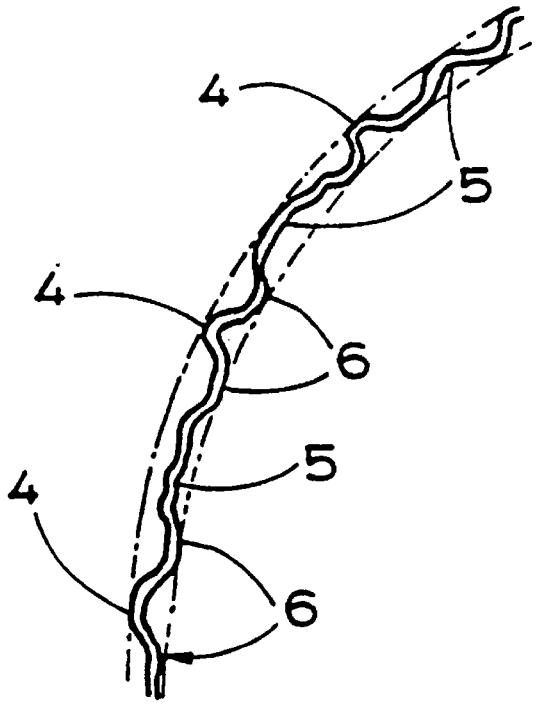
FIG. 2 is a side sectional view of a curved reel-strip in accordance with the invention.
Figure 3:
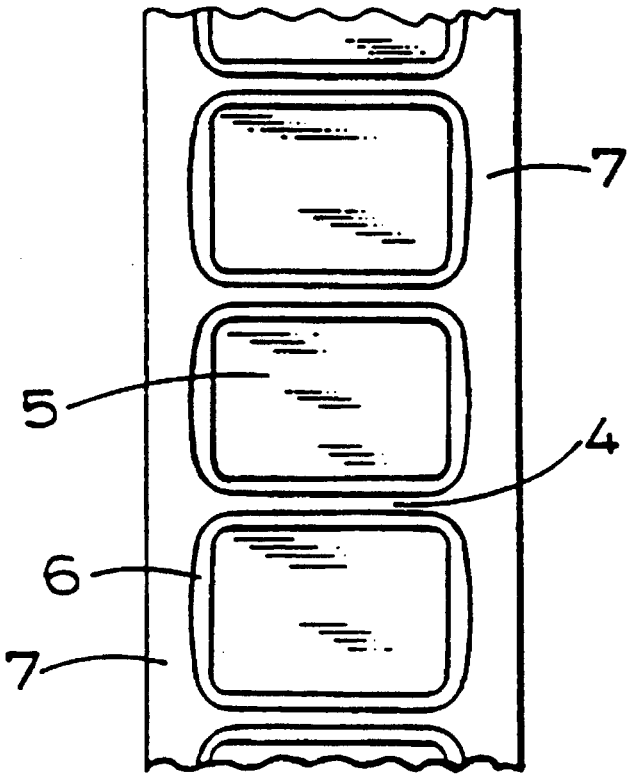
FIG. 3 is a front view of the reel-strip of FIG. 2.
Figure 4:
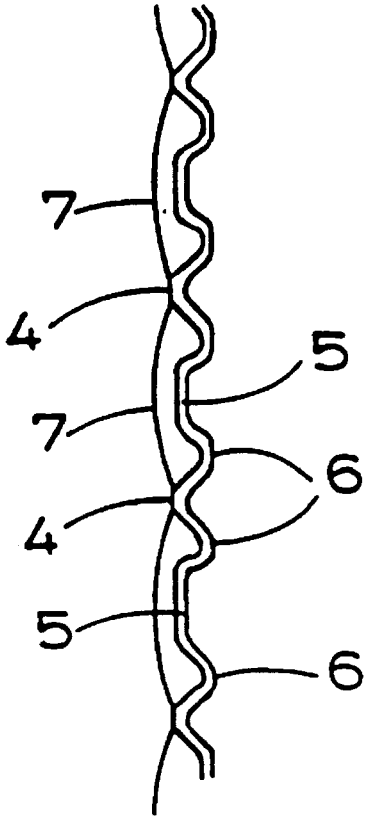
FIG. 4 is a side sectional view of the strip of FIGS. 2 and 3 in flat form.

The reel-strip shown in FIGS. 2 to 4 may be formed from thin plastics sheet material and has raised sections 4 and a plurality of symbols 5 formed in relief surrounded by sunken surrounding regions 6. As shown in FIG. 4 the reel-strip may initially be made in flat form before it takes up its curved position in use as part of a fruit machine reel. In its flat form, the borders 7 of the reel-strip may bulge slightly above the raised sections 4 but in its curved form (FIG. 2) they will normally have the same radius from the centre of the reel as the raised sections 4 between the symbols 5 and their surrounding sunken regions 6.

In an alternative arrangement, the borders 7 of the reel strip may be formed such that they are flat when the reel strip is curved around a drum reel. In this case, bends, or lines of weakness are formed at the boundaries between adjacent symbol frames 5 to ensure that the reel is very nearly polygonal and does not bulge outwards near the centre of a frame.

It will be appreciated that the symbols 5 have a maximum height above their surrounding regions 6 such that when the strip forms at least part of a reel assembly, the radius of the outermost surface of the fruit symbols 5 does not exceed the rotational radius of the front of the reel constituted by the raised sections 4 and the borders 7 of the strip.

Figure 7:
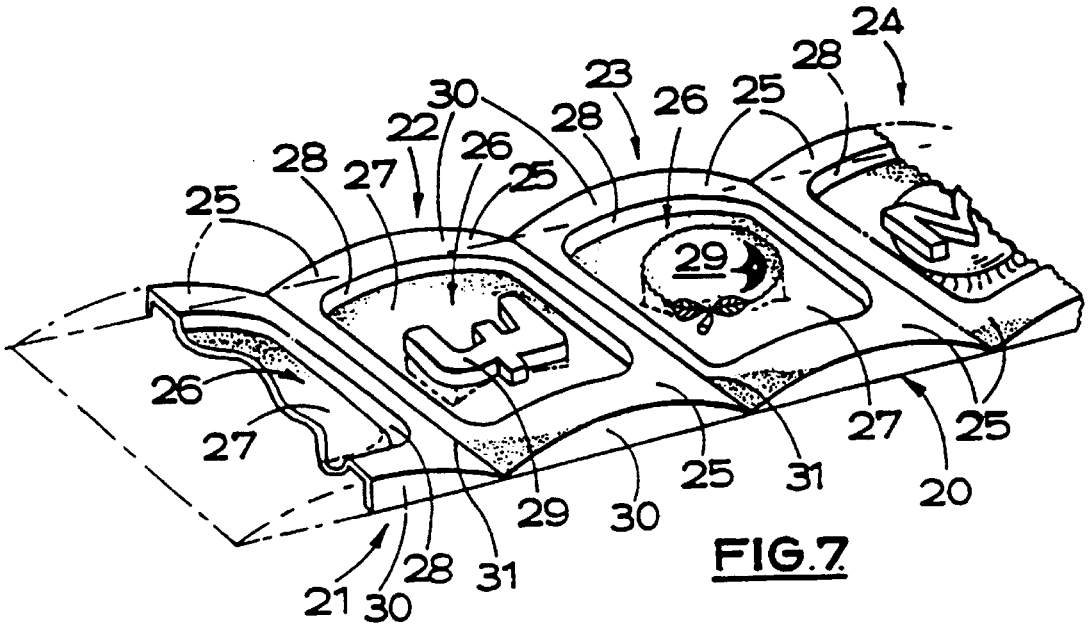
FIG. 7 shows another reel-strip in accordance with the invention in a flat configuration.
Figure 8:
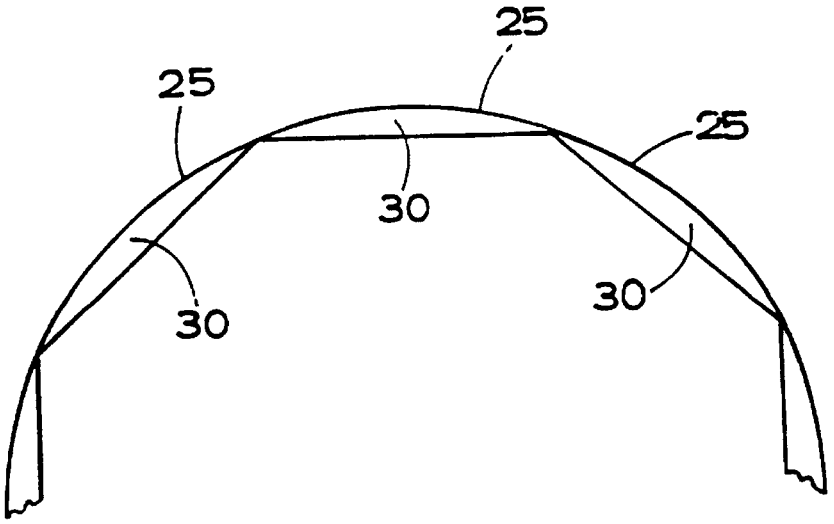
FIG. 8 shows the reel-strip of FIG. 7 in its configuration of use.

Another embodiment of the first aspect of the invention is shown in FIGS. 7 and 8. FIG. 7 shows a moulded plastics reel-strip 20 having adjacent segments 21, 22, 23 and 24 in a flat configuration. The strip 20 is a vacuum moulded thin plastics component, each segment comprises a part-cylindrical frame surface 25, a recess 26, a base surface 27 of the recess, side surfaces 28 of the recess, a relief symbol 29 standing proud of the base surface 27, and two opposed spaced side walls 30. A line of flexing, or weakness 31 is provided between the adjacent frame surfaces 25 of adjacent segments.

The symbols 29 project above the respective base surfaces 27 to an extent which is not more than the depth of the recess, thus staying at or below the level of the respective frame surfaces 25. The symbols 29 may have a substantially flat upper surface, such as the pound symbol of segment 22, or a dimpled or profiled surface such as the orange of segment 23. A number may be moulded with the symbol (see segment 24).

The side walls 30 are segments of a circle and when the strip 20 is in use (see FIG. 8) the frame surfaces 25 lie in a common cylinder, with the side walls 25 being segments of a first or a second circle (depending upon which side of the segments the walls are provided).

Figure 5:
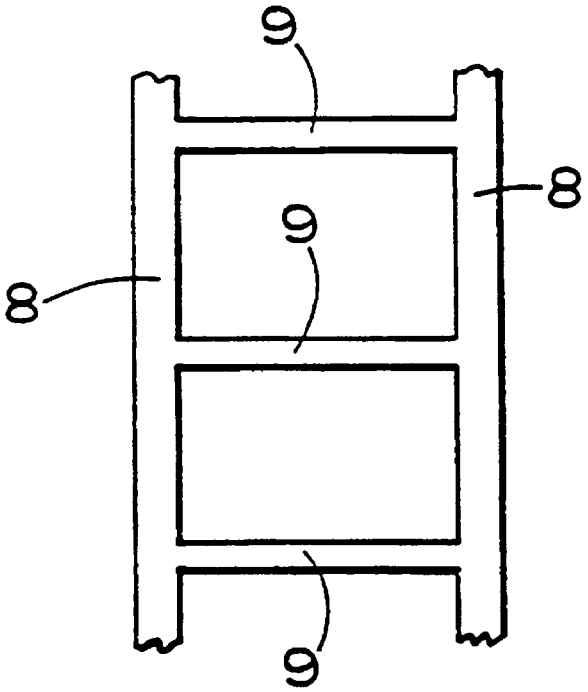
FIG. 5 is a front view of a support element for the reel-strip of FIGS. 2 to 4.
Figure 6:
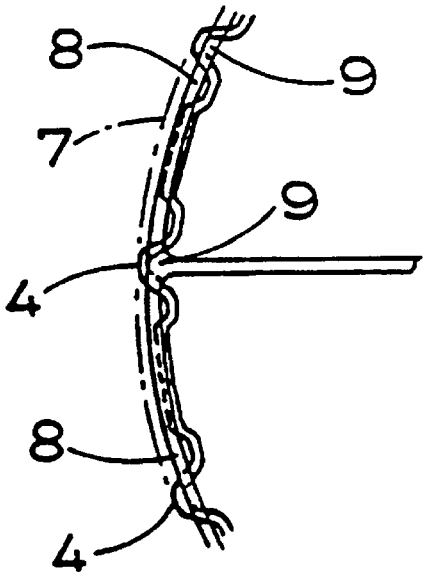
FIG. 6 is a sectional view showing a reel-strip in accordance with the invention mounted on the support element of FIG. 5.

The reel-strips of FIGS. 2 to 4 and 7 and 8 can be mounted readily on a support element of skeletal form having ring members 8 connected at regular intervals by transverse cross-members 9 (FIGS. 5 and 6). In this arrangement the sunken surrounding regions 6 which "frame" the symbols 5 can be positively located between the cross-members 9, thus locating accurately the position of the symbols on the support element. The support element need have only one ring provided with transverse support members, and/or could comprise a dished plate.

The reel-strips of FIGS. 2 to 4 and 7 and 8 can also be mounted by means of one, or two spaced, ring members provided at an edge of the strip, the ring members defining a channel in which the edge (or edges) of the strip is received. The edge of the strip may have a flange provided for location in such a channel; for example the strip 20 of FIGS. 7 and 8 could have a flange projecting outwards at right angles to the side walls 30.

I claim:

1. A reel strip for a gaming or amusement machine comprising a first surface region and at least one sunken region, said at least one sunken region being provided below the level of said first surface region and said at least one sunken region being provided with at least one symbol or fruit, wherein said at least one symbol is formed in relief and said at least one sunken region and said at least one symbol are integrally formed.

2. A reel strip according to claim 1, wherein said first surface region extends at least partially around said at least one sunken region.

3. A reel strip according to claim 1, wherein said at least one symbol is formed in relief at said at least one sunken region.

4. A reel strip according to claim 1, wherein said at least one symbol is formed in relief and projects from said at least one sunken region to a height not substantially greater than that of said first surface region.

5. A reel strip according to claim 1, wherein said first surface region comprises a frame surface extending around said at least one sunken region.

6. A reel strip according to claim 1, wherein said at least one sunken region has a three-dimensional profiled symbol.

7. A reel strip according to claim 1, wherein said reel strip is comprised of plastics material.

8. A reel for a gaming or amusement machine comprising support means supporting a reel strip, wherein the reel strip is in accordance with claim 1.

9. A gaming or amusement machine which incorporates a reel strip in accordance with claim 1.

10. A reel strip for a gaming or amusement machine comprising a first surface region and at least one sunken region, said at least one sunken region being provided below the level of said first surface region, said reel strip having an inner surface and an outer surface wherein said inner surface and said outer surface both have variable relief.

11. A reel for a gaming or amusement machine comprising support means supporting a reel strip, wherein the reel strip is in accordance with claim 10.

12. A gaming or amusement machine which incorporates a reel strip in accordance with claim 10.

13. A reel strip for a gaming or amusement machine comprising a first surface region and at least one sunken region, said at least one sunken region being provided below the level of said first surface region, one or more of said at least one sunken region being provided with a symbol or fruit, wherein said reel strip is formed from a plurality of segments being interconnected by lines of interconnection, and said segments being permitted to flex along said lines of interconnection.

14. A reel strip according to claim 13, wherein each segment has a portion of said first surface region and a sunken region.

15. A reel strip according to claim 13, wherein each of said segments has a frame surface, said frame surface extending substantially around said at least one sunken region, said frame surfaces being parts of cylindrical arcs with the axes of curvature being at right angles to the length of said reel strip so that when said reel strip is curved around support means to form a reel said frame surfaces lie on a common cylindrical surface.

16. A reel strip according to claim 15, wherein said frame surface is flat instead of being pan of a cylindrical surface, said reel strip forming a polygon when it is curved around support means to form a reel.

17. A reel strip for a gaming or amusement machine comprising an outer surface and an inner surface, said outer surface having a first surface region and a region which is sunken relative to said first surface region, said sunken region being provided with a symbol or fruit, wherein said first surface region extends around the periphery of said sunken region.

18. A reel strip for a gaming or amusement machine having an outer surface and an inner surface, said outer surface having a first surface region and a region which is sunken relative to said first surface region, said sunken region being provided with a symbol or fruit, wherein said inner surface has a sunken region and a raised region, said sunken region on said inner surface corresponding with said first surface region on said outer surface and said raised region on said inner surface corresponding with said sunken region on said outer surface such that said reel strip has a substantially constant thickness throughout.

19. A reel strip for a gaming or amusement machine comprising a raised region and a plurality of lower, sunken regions, each of said plurality of sunken regions being provided with a symbol or fruit and being surrounded and framed by respective portions of said raised region.

20. A reel strip according to claim 19, wherein each of said sunken regions is of substantially the same shape.

21. A gaming or amusement machine which has a reel strip in accordance with claim 19.

* * * * *

UNITED STATES PATENT AND TRADEMARK OFFICE

CERTIFICATE OF CORRECTION

PATENT NO. : Re. 35,182

DATED : March 19, 1996

INVENTOR(S) : T. Howard

It is certified that error appears in the above-indentified patent and that said Letters Patent is hereby corrected as shown below:

| COLUMN | LINE | |
|---|---|---|
| 6 (Claim 16, | 28 line 2) | "pan" should read --part-- |

Signed and Sealed this

Sixth Day of August, 1996

*Attest:*

*Attesting Officer*

BRUCE LEHMAN

*Commissioner of Patents and Trademarks*